Nov. 5, 1963  H. HARDY  3,109,199
INJECTION MOLDING APPARATUS FOR MAKING FOOTWEAR
Filed Feb. 6, 1961

INVENTOR.
Henry Hardy
BY
Roberts, Cushman & Grover
ATT'YS

United States Patent Office 3,109,199
Patented Nov. 5, 1963

3,109,199
INJECTION MOLDING APPARATUS FOR MAKING FOOTWEAR
Henry Hardy, Cambridge, Mass., assignor to International Vulcanizing Corporation, Boston, Mass., a corporation of Massachusetts
Filed Feb. 6, 1961, Ser. No. 87,364
1 Claim. (Cl. 18—30)

This invention relates to molding apparatus for use in the manufacture of shoes and more especially to injection molds and injection apparatus for filling the molds.

Such molds usually comprise a bottom part and a peripherally disposed wall, the latter being split along a median from toe to heel and containing an injection orifice at the interfaces so that, following injection and setting, the mold parts may be separated to permit removing the finished shoe and detachment of the sprue. The injection apparatus customarily has a discharge orifice and is provided with a nozzle which extends therefrom for engagement with the injection orifice in the mold to conduct the plastic from the injection apparatus to the mold. A cut-off valve is employed in the discharge orifice to check the flow of the plastic when the mold is filled. Due to the fact that the nozzle has to be of appreciable length and so extends forwardly from the heated portion of the injection apparatus and there is an appreciable interval between successive injections, the plastic which flows through the orifice beyond the valve into the nozzle cools down so much that it becomes partially set, hence, when the next injection is effected, a partially set plug of plastic, corresponding in length to the length of the nozzle, is forced into the mold cavity ahead of the completely liquid plastic. Such semisolid plugs spoil the homogeneity of the bottom, may be visible at the surface as imperfections and constitute areas of weakness. The principal objects of this invention are therefore to provide molding apparatus designed to eliminate the foregoing disadvantages without requiring substantial modification thereof.

As herein illustrated, the conventional injection nozzle is removed from the injection orifice of the injection apparatus and a transfer tube, split medially lengthwise to provide two halves, is mounted by attachment of its halves at one end to the separable halves of the mold to provide a passage through which molding composition may be forced into the mold cavity when the separable halves of the mold are closed, the transfer tube halves being separable when the separable halves of the mold are separated to permit removal of the sprue. The distal ends of the transfer tube halves are adapted, by engagement with the discharge orifice of the injection apparatus, to be held pressed together during injection to prevent leakage lengthwise of the transfer tube. The extremities of the transfer tube halves may be beveled for interengagement with more acutely beveled portions in the orifice to augment such pressure.

The invention will now be described in greater detail with reference to the accompanying drawings wherein:

FIG. 3 is an end elevation taken on the line 3—3 of FIG. 2;

Figure 1:
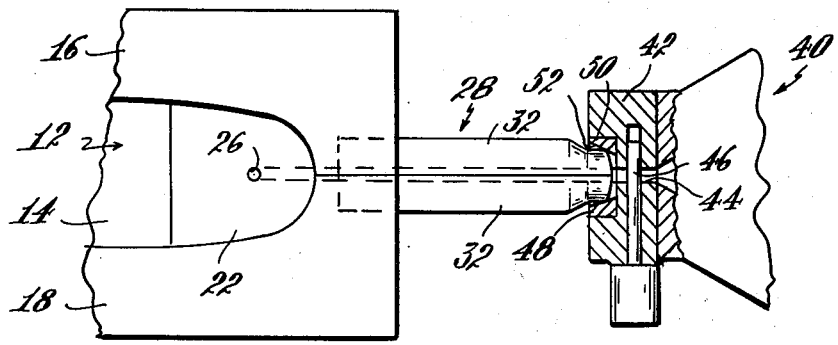
FIG. 1 is a plan view of a mold and injection apparatus, showing the injection transfer tube fixed to the mold and engaged with the injection apparatus.

Referring to the drawing (FIG. 1), the mold has a one-piece bottom part 12, the upper face 14 of which corresponds in shape to the bottom of the shoe to be made and a peripherally disposed wall divided medially from heel to toe into two side wall sections 16 and 18 which are adapted to fit together about the bottom and the inner surface of which corresponds to the peripheral shape of the bottom. The parting faces 20 at the opposite ends of the side wall sections are flat and fit closely so that the bottom and walls collectively provide a mold cavity 22 open at the top. The injection opening, through which the plastic is charged into the mold cavity, is formed partly in the wall and partly in the bottom, there being a portion 24 at the interfaces between the walls and a portion 26 in the bottom which extends upwardly through the surface 14 into the mold cavity. Half of the portion 24 is situated in the parting face 20 of each of the side wall sections 16 and 18.

In accordance with the invention, a transfer tube 28 is mounted at the end of the mold containing the injection openings 24 and 26, through which there is an axial passage 30. The transfer tube is split medially lengthwise to provide two halves 32—32, each of which contains one-half of the passage 30 and each half is fixed at one end in a recess 34 in the parting faces 20 of the side walls of the mold by screw bolts 36, with the half of its passage 30 aligned with the half of the passage 24. The distal end of the transfer tube 28 has a terminal end or tip 38 of somewhat reduced circular cross-section, as shown in FIG. 3.

The halves 32—32 of the transfer tube, screwed to the side walls of the mold, are held together at that end when the latter are closed and the distal ends are held together by engagement with the discharge opening of the injection apparatus, as will subsequently appear.

The side walls of the mold may be moved into and out of engagement with any suitable mechanism such, for example, as the toggle mechanism shown in my Patent No. 2,878,523.

The injection apparatus 40 (FIG. 1) is provided with an orifice plate 42 containing a discharge passage 44 which is of short length axially and contains a cut-off valve 46 close to its inner end. At its outer end a rigid metal ring 48 is set into a recess 50 concentric with the opening 44, the outer side of which is beveled at 52 at a more acute angle than the tip of the transfer tube, so that as the tip 38 of the transfer tube is forced into the ring the latter will apply pressure radially in directions to squeeze the halves of the transfer tube together.

The injection apparatus is designed so that the length of the discharge orifice 44 is short and the cut-off valve 46 close to its outer end. Thus, when the end of the transfer tube is removed from the discharge orifice, very little plastic is left in the orifice at the outer side of the valve. Moreover, since the injection apparatus is of the Foster-Yates type having a heated barrel, the orifice plate is kept hot by conductance hence what little plastic there is left in the orifice, after cut-off, is kept substantially liquid.

Figure 2:
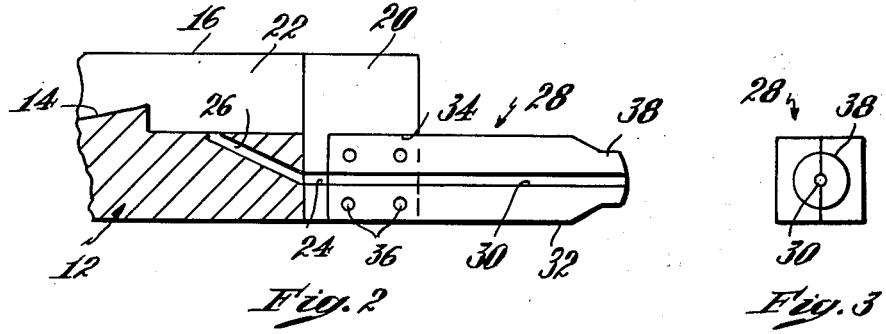
FIG. 2 is a vertical section taken lengthwise of the mold showing one-half of the transfer tube.
Figure 4:
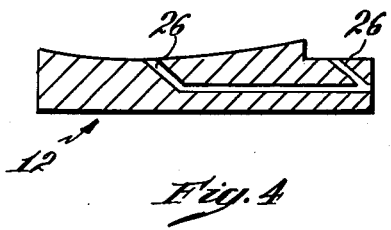
FIG. 4 is a vertical section through a mold bottom having two injection openings, one at the heel end and one at the toe end.
Figure 5:
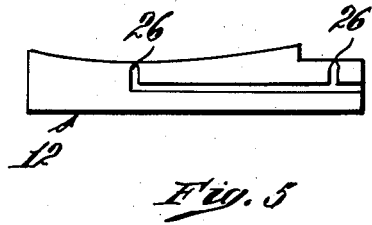
FIG. 5 is an elevation of one-half of a divided mold bottom showing two injection openings, one at the heel end and one at the toe end.

In the form of the invention shown in FIGS. 1 and 2, the bottom part of the mold is one-piece and the single injection opening is inclined so that the sprue may be easily removed after the walls have been separated by pulling it lengthwise from the bottom. In fact, even if there are two injection openings, one at the heel end and one at the toe end, as shown in FIG. 4, the sprue may still be removed lengthwise provided the injection openings are inclined as shown. If, however, the injection openings 26 are perpendicular to the bottom, as shown in FIG. 5, the bottom must be split medially from toe to heel in order to permit removal of the sprue.

Insofar as the invention is concerned, it is immaterial whether the bottom is one-piece or divided. Furthermore, the injection opening may be entirely in the wall or entirely in the bottom without departing from the spirit of the invention.

It should be understood that the present invention is for the purpose of illustration only and that this invention includes all modifications and equivalents which fall within the scope of the appended claim.

I claim:

Apparatus for injection molding of bottoms to shoes, comprising a mold containing a cavity corresponding in shape to the bottom to be attached to a shoe, said cavity being open at the top for receiving and supporting a lasted shoe upper to hold the bottom of the lasted upper spaced from the bottom of the mold cavity, said mold being split medially from end-to-end, the abutting faces of the mold halves at one end, rearwardly of the cavity, containing opposed, substantially rectangular recesses and in the faces forwardly of the recesses elongate channels which extend from the recesses through the bottom parts of the halves beneath the cavity upwardly into the cavity at the heel end, a rigid transfer tube having a portion of rectangular section and a portion of cylindrical section, said tube being split longitudinally, each half containing a channel lengthwise thereof, means securing the rectangular portion of each tube half in one of the recesses so that the abutting faces of the tube halves coincide with the abutting faces of the mold halves, the channels therein are aligned with the channels in the mold halves and the cylindrical portions of the tube halves extend away from the end of the mold halves in parallel relation, said cylindrical portions of the tube halves having, at their distal ends, rounded portions, an injection device for injecting a bottom-forming composition through the tube into the mold cavity when the mold halves and injection tube halves are held engaged, said injection device having a discharge opening containing a re-entrant conical bearing circumferentially thereof adapted to receive the rounded end of the nozzle halves, said conical bearing being operative, by relative movement of the mold and injection device toward each other, to squeeze the distal ends of the tube halves toward each other into such intimate contact as to seal the abutting faces of the tube halves throughout their length.

References Cited in the file of this patent
UNITED STATES PATENTS

| | | |
|---|---|---|
| 1,445,624 | Harris | Feb. 20, 1923 |
| 2,439,506 | Christian | Apr. 13, 1948 |
| 2,470,089 | Booth | May 17, 1949 |
| 2,687,554 | Root | Aug. 31, 1954 |
| 2,737,686 | Harkenrider | Mar. 13, 1956 |
| 2,871,517 | Allard | Feb. 3, 1959 |
| 2,937,405 | Berggren et al. | May 24, 1960 |
| 2,994,920 | Patera | Aug. 8, 1961 |
| 3,014,242 | Baker et al. | Dec. 26, 1961 |